United States Patent
Singh et al.

(10) Patent No.: US 11,909,603 B2
(45) Date of Patent: Feb. 20, 2024

(54) PRIORITY BASED RESOURCE MANAGEMENT IN A NETWORK FUNCTIONS VIRTUALIZATION (NFV) ENVIRONMENT

(71) Applicant: Cisco Technology, Inc., San Jose, CA (US)

(72) Inventors: Akshya Kumar Singh, Fremont, CA (US); Vipin Dravid, Fremont, CA (US); Young Kook Bae, Monte Sereno, CA (US)

(73) Assignee: Cisco Technology, Inc., San Jose, CA (US)

( * ) Notice: Subject to any disclaimer, the term of this patent is extended or adjusted under 35 U.S.C. 154(b) by 356 days.

(21) Appl. No.: 15/829,734

(22) Filed: Dec. 1, 2017

(65) Prior Publication Data

US 2019/0173803 A1 Jun. 6, 2019

(51) Int. Cl.
*H04L 41/5025* (2022.01)
*H04L 41/5054* (2022.01)
(Continued)

(52) U.S. Cl.
CPC ...... *H04L 41/5025* (2013.01); *G06F 9/45558* (2013.01); *G06F 9/5077* (2013.01);
(Continued)

(58) Field of Classification Search
CPC ............. H04L 41/5025; H04L 41/5022; H04L 41/0816; H04L 41/5019; H04L 41/0896;
(Continued)

(56) References Cited

U.S. PATENT DOCUMENTS 9,596,189 B1 * 3/2017 Lea ...................... G06F 9/45558
9,882,828 B1 * 1/2018 Sandlerman ............ H04L 47/74
(Continued)

FOREIGN PATENT DOCUMENTS

JP 2017143477 A * 8/2017
WO WO 2017/144094 8/2017
(Continued)

OTHER PUBLICATIONS

International Search Report and Written Opinion from the International Searching Authority, dated Feb. 14, 2019, 14 pages, for the corresponding International Patent Application No. PCT/US18/63475.

*Primary Examiner* — Lance Leonard Barry
(74) *Attorney, Agent, or Firm* — Polsinelli P.C.

(57) ABSTRACT

A virtual network function (VNF) controller (or module) instantiates two or more VNFs in a communication network to support a network service where the two or more VNFs include at least a first VNF and a second VNF. The VNF controller assigns a priority value to each VNF base on an overall network impact, a physical location of at least one network resource allocated to the respective VNF, a type of service to be implemented by the respective VNF and a customer impact based on how many customers would be using the respective VNF. The VNF controller monitors network resources allocated to each VNF. The VNF controller further determines the first VNF requires additional network resources and releases the network resources allocated to the second VNF based on respective priority values. The VNF controller further allocates the network resources released by the second VNF to the first VNF.

20 Claims, 7 Drawing Sheets

(51) Int. Cl.
| | |
|---|---|
| *H04L 41/0893* | (2022.01) |
| *H04L 41/0896* | (2022.01) |
| *H04L 41/0816* | (2022.01) |
| *H04L 41/5022* | (2022.01) |
| *H04L 41/5019* | (2022.01) |
| *H04L 41/0895* | (2022.01) |
| *H04L 41/40* | (2022.01) |
| *G06F 9/455* | (2018.01) |
| *G06F 9/50* | (2006.01) |
| *H04L 43/0876* | (2022.01) |
| *H04L 47/70* | (2022.01) |

(52) U.S. Cl.
CPC ...... *H04L 41/0816* (2013.01); *H04L 41/0893* (2013.01); *H04L 41/0895* (2022.05); *H04L 41/0896* (2013.01); *H04L 41/40* (2022.05); *H04L 41/5019* (2013.01); *H04L 41/5022* (2013.01); *H04L 41/5054* (2013.01); *H04L 43/0876* (2013.01); *H04L 47/822* (2013.01); *G06F 2009/4557* (2013.01); *G06F 2009/45575* (2013.01)

(58) Field of Classification Search
CPC ............. H04L 41/0893; H04L 41/5054; H04L 47/822; H04L 43/0876; H04L 12/4641; H04L 41/5009; G06F 2009/4557; G06F 2009/45575; G06F 9/5077
See application file for complete search history.

(56) References Cited

U.S. PATENT DOCUMENTS

| | | | |
|---|---|---|---|
| 10,070,344 B1* | 9/2018 | Dowlatkhah | H04W 28/16 |
| 10,230,573 B2* | 3/2019 | Rasanen | H04W 24/02 |
| 2004/0083295 A1* | 4/2004 | Amara | H04L 12/4633 709/229 |
| 2016/0119189 A1* | 4/2016 | Choi | H04L 41/0895 709/223 |
| 2016/0147687 A1* | 5/2016 | Check | G06F 9/45558 710/117 |
| 2016/0203022 A1 | 7/2016 | Challa et al. | |
| 2017/0299645 A1* | 10/2017 | Wang | G06F 11/3051 |
| 2019/0026664 A1* | 1/2019 | Ganti | G06Q 10/0635 |
| 2019/0052528 A1* | 2/2019 | Yoshimura | H04L 41/0813 |
| 2019/0104022 A1* | 4/2019 | Power | H04L 43/20 |
| 2019/0166010 A1* | 5/2019 | Dome | A63F 13/46 |
| 2020/0221347 A1* | 7/2020 | Dowlatkhah | H04W 28/0289 |

FOREIGN PATENT DOCUMENTS

| | | | |
|---|---|---|---|
| WO | WO 2017/170470 | 10/2017 | |
| WO | WO-2018134911 A1 * | 7/2018 | ............... G06F 9/46 |

* cited by examiner

PRIORITY BASED RESOURCE MANAGEMENT IN A NETWORK FUNCTIONS VIRTUALIZATION (NFV) ENVIRONMENT

TECHNICAL FIELD

This disclosure relates generally to communications systems, more particularly, to managing resources in a Network Functions Virtualization (NFV) environment.

BACKGROUND

In the telecommunication industry, products were traditionally developed and deployed according to rigorous standards to ensure stability, protocol adherence, quality of service, and the like. However, such rigorous standards led to long product cycles and a reliance on proprietary hardware. Due, in part, to increasing competition from service providers operating over public networks (e.g., the Internet), industry leaders developed and adopted virtual network architectures, such as Network Functions Virtualization (NFV), which virtualize network node functions using software. In operation, these virtual network architectures can employ one or more Virtualized Network Functions (VNFs), which decouple conventional network functions from proprietary hardware and create network structures compatible with commodity hardware (e.g., industry standard servers, switches, storage devices, etc.). In turn, the VNFs reduce a time-to-market for services and reduce capital/operating expenditures. However, certain challenges arise when leveraging these virtual network architectures and/or virtual network functions to achieve or maintain network service objectives (e.g., provide Service Level Agreement (SLA) assurance, perform scaling/healing operations, and the like).

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

According to one or more embodiments of the disclosure, a VNF controller (or module) instantiates two or more VNFs in a communication network to support a network service where the two or more VNFs include at least a first VNF and a second VNF. The VNF controller assigns a priority value to each VNF and monitors network resources allocated to each VNF. The VNF controller further determines the first VNF requires additional network resources (e.g., virtual resources such as network, compute, memory, etc.) and releases the network resources allocated to the second VNF based on respective priority values. The VNF controller further allocates the network resources released by the second VNF to the first VNF.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A communication network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
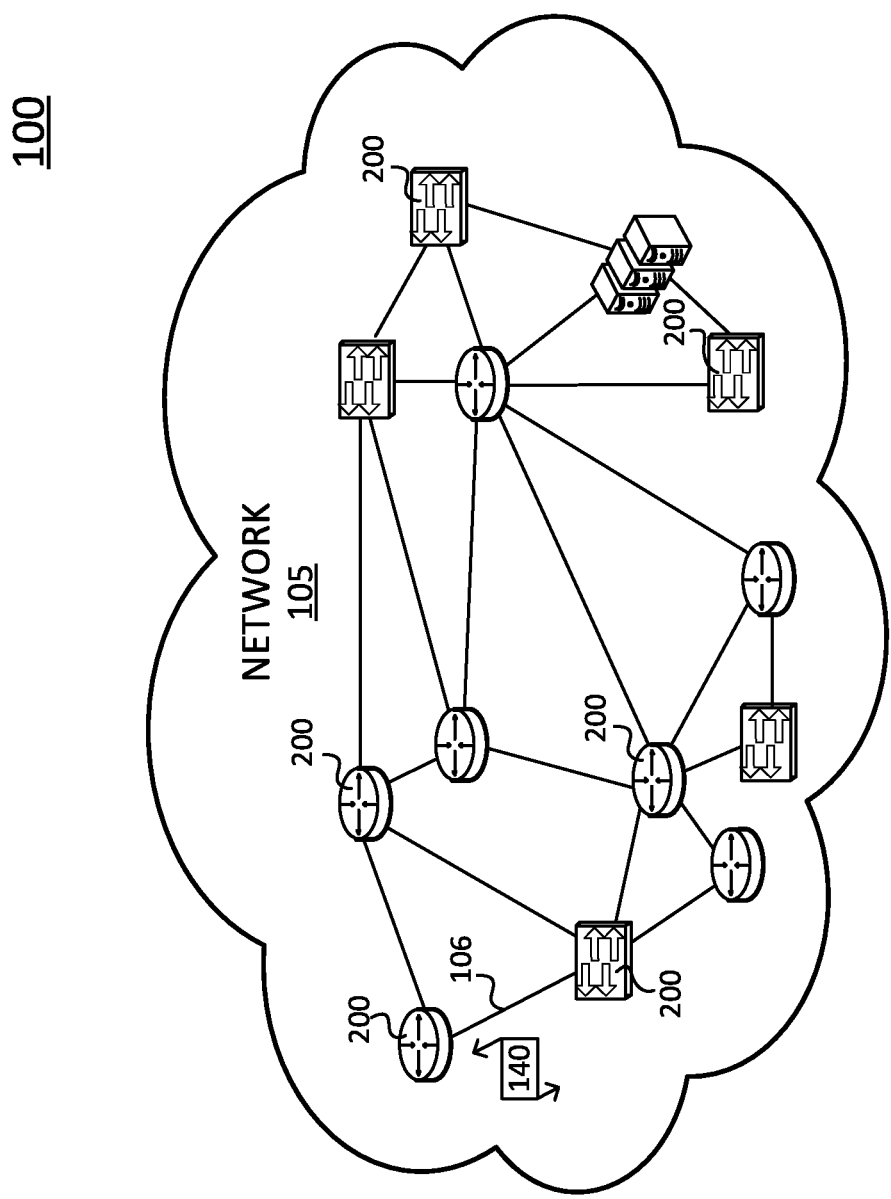
FIG. 1 illustrates an example communication environment.

FIG. 1 illustrates an example communication environment 100 illustratively comprising a network 105, which can represent an enterprise network, data center network, and the like. Such network 105 may be accessible by devices communicating over other networks (e.g., the Internet), not shown. It is appreciated that various other types of networks and/or sub-divisions within these networks are often present; however, communication environment 100 is illustrated and described herein for purposes of discussion and simplicity.

Network 105 include nodes/devices 200 (e.g., routers, switches, servers, and the like) interconnected by communication links 106. Communication links 106 may be wired links or shared media (e.g., wireless links, etc.) where certain devices may be in communication with other nodes/devices based on, for example, distance, signal strength, network/node topology, current operational status, location, etc. Data packets 140 (e.g., traffic and/or messages) may be exchanged among the nodes/devices 200 in communication environment 100 using predefined network communication protocols such as certain known wired protocols (e.g., Interior Gateway Protocol (IGP), Exterior Border Gateway Protocol (E-BGP), TCP/IP, etc.), wireless protocols (e.g., IEEE Std. 802.15.4, WiFi, Bluetooth®, etc.), Programmable Logic Controller (PLC) protocols, or other shared-media protocols where appropriate. In this context, a protocol consists of a set of rules defining how the nodes interact with each other. Those skilled in the art will also understand that any number of computing resources, devices, links, etc. may be used in network 105, and that the view shown herein is for simplicity.

Figure 2:
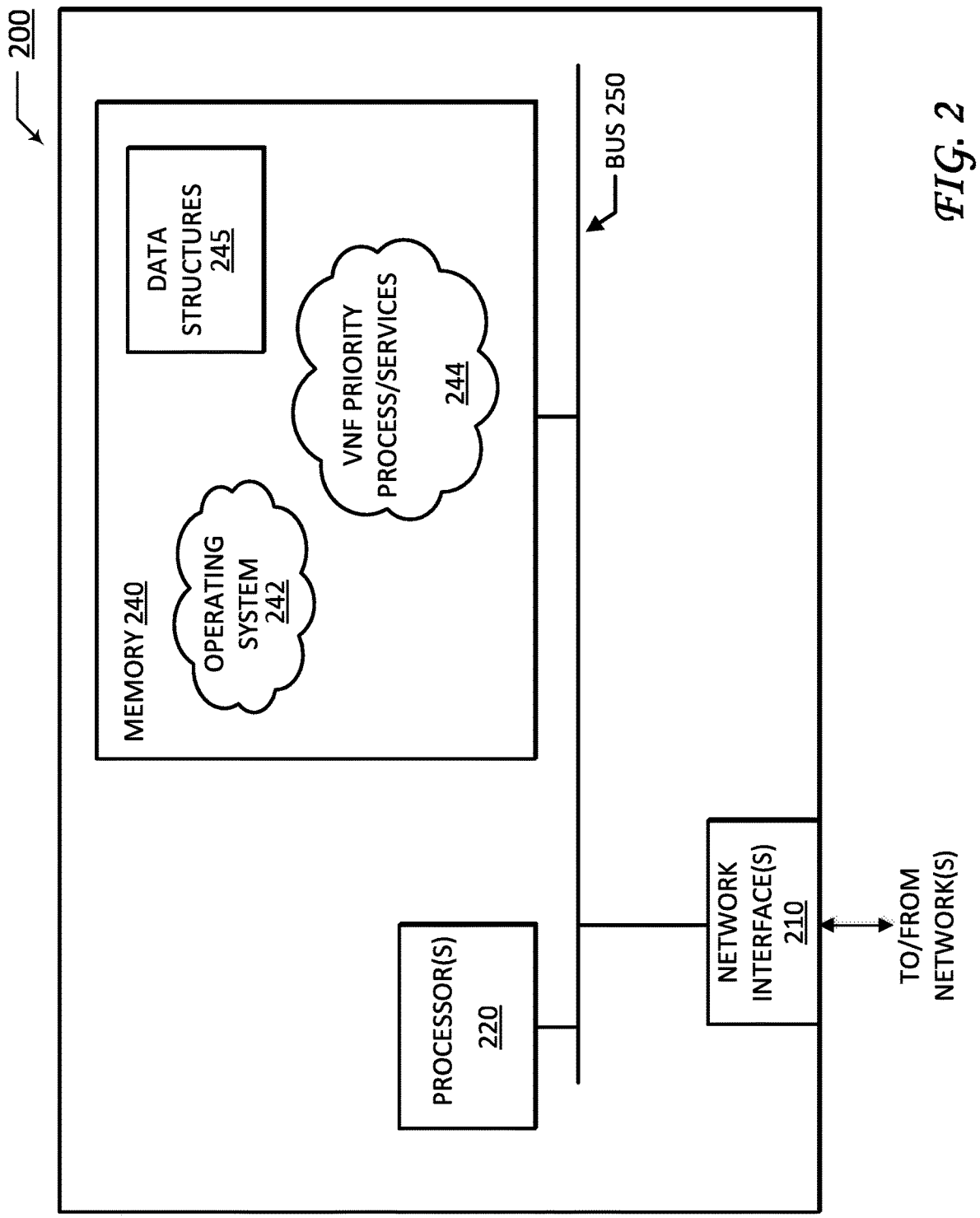
FIG. 2 illustrates an example device for performing Virtual Network Functions (VNF) prioritization techniques disclosed herein.

FIG. 2 is a schematic block diagram of device 200, which may be used with one or more embodiments described herein (e.g., in communication environment 100). Device 200 may comprise one or more network interfaces 210, at least one processor 220, and a memory 240 interconnected by a system bus 250. Network interface(s) 210 contain the mechanical, electrical, and signaling circuitry for communicating data over links coupled to one or more of the networks shown in communication environment 100. Network interfaces 210 may be configured to transmit and/or receive data using a variety of different communication protocols, as will be understood by those skilled in the art.

Memory 240 comprises a plurality of storage locations that are addressable by processor 220 for storing software programs and data structures associated with the embodiments described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of software processes and/or services executing on the device. These software processes and/or services may comprise an illustrative "VNF priority" process/service 244, as described herein. Note that while VNF priority process/service 244 is shown in centralized memory 240, some embodiments provide for these processes/services to be operated in a distributed computing network.

It will be apparent to those skilled in the art that other processor and memory types, including various computer-readable media, may be used to store and execute program instructions pertaining to the techniques described herein. For example, the techniques described herein may be performed by hardware, software, and/or firmware, such as in accordance with VNF priority process 244, which may contain computer executable instructions executed by the processor 220 to perform functions relating to the techniques described herein. Also, while this disclosure describes various processes, it is expressly contemplated such processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As discussed above, industry leaders developed virtual network architectures, which include an example NFV Management And Organization (MANO) model, adopted by the European Telecommunication Standards Institute Industry Specification Group (ETSI-ISG).

Figure 3:
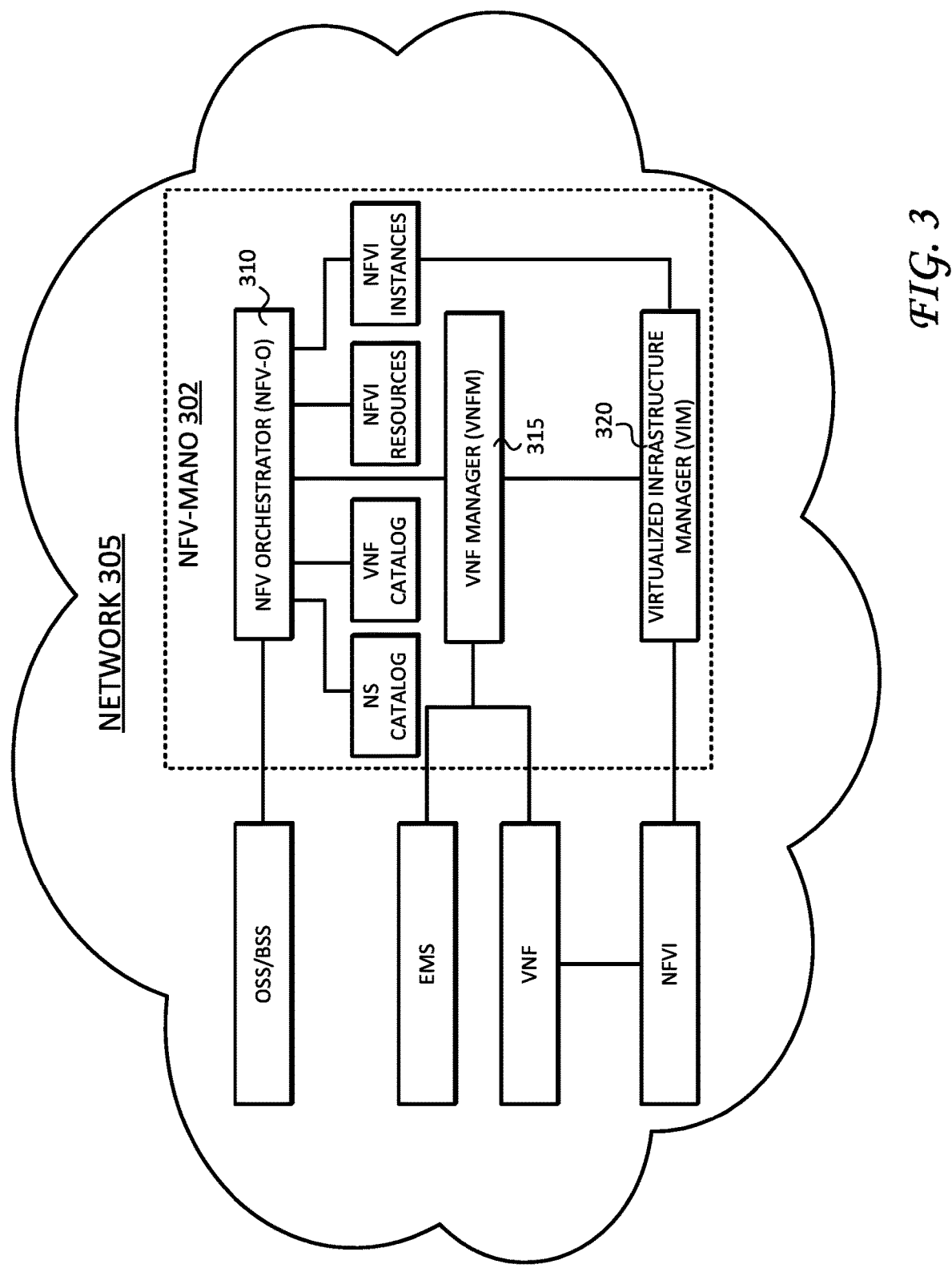
FIG. 3 illustrates an example virtual network architecture, showing a NFV Management and Organization (MANO) model.

FIG. 3 particularly illustrates a NFV MANO model 302. NFV MANO 302 provides a framework for managing and orchestrating resources in a data center network 305. NFV MANO 302 facilitates deploying and connecting services as they are decoupled from dedicated physical devices and moved to virtual machines (VMs). NFV MANO 302 includes a number of network elements, however, for purposes of simplicity and discussion herein, we focus on three functional blocks—i.e., an NFV Orchestrator (NFV-O) 310, a VNF Manager (VNFM) 315, and a Virtualized Infrastructure Manager (VIM) 320—which deploy and connect functions and services throughout data center network 305.

NFV-O 310 particularly supports and manages on-boarding, resources and policies, and integrate new network services and VNFs into a virtual framework. NFV-O 310 also validates and authorizes NFV Infrastructure (NFVI) resource requests (not shown).

VNFM 315 operates in conjunction with NFV-O 310 and VIM 320 and generally provides lifecycle management for VNFs as well as supports interoperability of software-defined network elements. For example, VNFM 315 can instantiate one or more new VNFs, scales VNFs, update and/or upgrade VNFs, and also terminate VNFs. In addition, VNFM 315 monitors key performance indicators (KPIs) during VNF lifecycles, which are important when performing scaling operations, healing operations, and the like. In this fashion, VNFM 315 maintains virtualized resources and supports VNF functionality.

VIM 320 controls and manages the NFV infrastructure, including network resources such as compute, storage, network, and the like. VIM 320 is flexible and may be configured to handle a certain type of NFVI resource (e.g. compute-only, storage-only, networking-only), and/or it may be capable of managing multiple types of NFVI resources (e.g. in NFVI nodes). In operation, VIM 320 orchestrates allocation, upgrades, releases, and reclaims of NFVI resources, manages associations between virtual and physical elements, and maintains an inventory of allocated virtual/physical resources.

While NFV MANO 302 virtualizes network components, certain challenges arise in the context of performing healing, scaling, and similar operations. For example, many service providers employ a number of Virtualized Network Functions (VNFs) (e.g., virtual machines executing software/processes), which are managed by a single infrastructure manager (e.g., VIM 320) in order to achieve network service objectives (E.g., Service Level Agreement (SLA) requirements (e.g., redundancy, scaling, differing service requirements for certain services, etc.)). In some situations, issues may arise from dynamic and changing network environments/conditions such as power failures, server failures, storage failures, resource bottlenecks and/or changes to network resource availability (e.g., due to sudden spikes in service usage), changes in customer requirements/services, and the like. In such situations, some network resources allocated to a particular VNF may go unused (e.g., virtual resources such as compute, storage/memory, network, etc.). In addition, network resource allocation between VNFs (e.g., between different services) may cause a disproportionate subscriber/service impact (e.g., a resource failure for a gateway service VNF may impact a large number of subscribers and bring down basic connectivity as compared to a premium service VNF used by a small number of subscribers). Accordingly, the techniques disclosed herein address the dynamic and changing network conditions by prioritizing and orchestrating VNF operations (e.g., deployment, recovery, etc.) in a hosted environment. Indeed, the techniques disclosed herein establish a priority framework that ensures critical VNFs are running in the event of a failure, re-distributes resources between VNFs to maintain certain SLA objectives, and provides a flexible and scalable framework for implementing VNFs.

Figure 4:
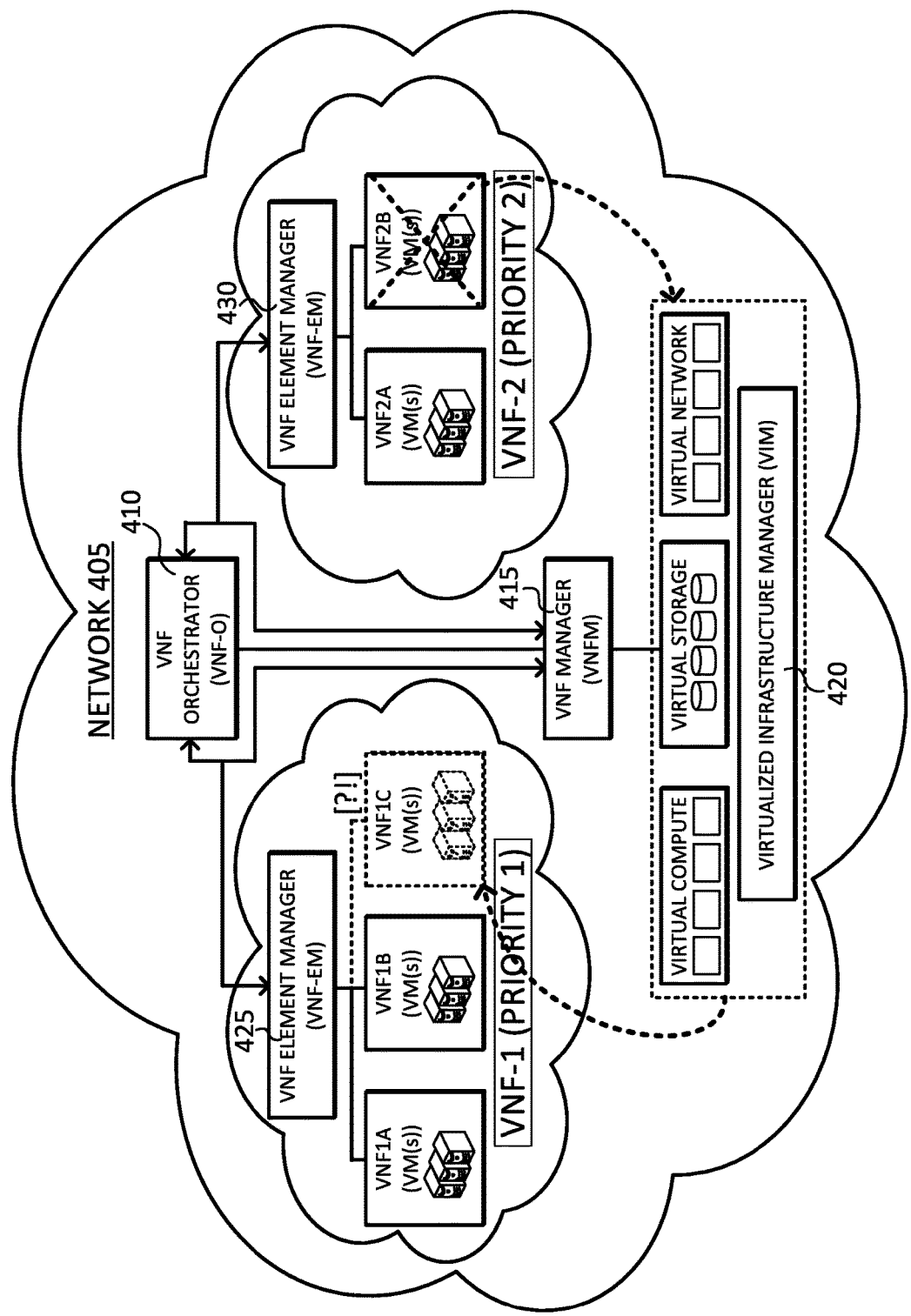
FIG. 4 illustrates a communication network which employs the VNF prioritization techniques disclosed herein.

FIG. 4 illustrates a communication network (e.g., a data center network 405), which employs VNF prioritization techniques according to one exemplary embodiment of this disclosure. As shown, data center network 405 includes an NFV Orchestrator (VNF-O) 410, a VNF Manager (VNFM) 420, and a Virtualized Infrastructure Manager (VIM) 420.

VNF-O 410 supports and manages VNFs, including the illustrated "VNF-1" and "VNF-2". Here, VNF-O 410 communicates with VNF Element Managers (VNF-EM(s)) 425 and 430, which comprise allocated network resources (e.g., virtual machines (VMs)). VNFM 415 operates in conjunction with VNF-O 410 and VIM 420 and provides lifecycle management for VNFs as well as supports interoperability of software-defined network elements. For example, VNFM 315 instantiates VNFs, terminates VNFs, and maintains virtualized resources for VNFs. VIM 320 controls and manages the NFV Infrastructure (NFVI), including compute, storage, and network resources. VIM 320 is flexible and may be configured to handle different types of NFVI resource (e.g. compute-only, storage-only, networking-only), and/or it may be capable of managing multiple types of NFVI resources (e.g. in NFVI nodes). VIM 420 also orchestrates allocation, upgrades, releases, and reclaims of NFVI resources, manages associations between virtual and physical elements, and maintains an inventory of allocated virtual/physical resources.

In operation, the VNF prioritization techniques generally provide a mechanism to evaluate and redistribute resources for a network service across multiple VNFs. Accordingly, the VNF prioritization techniques are typically employed by a VNF controller or a network manager/orchestrator component such as the illustrated VNF-O 410, VNFM 415, VIM 420, a combination of these components, and/or functionality similar components. Accordingly, while certain VNF prioritization operations are discussed and described with respect to a specific component, it is appreciated such operations may be performed by a single component or module such as a VNF controller (e.g., a module that can emulate operations of VNF-O 410, VNFM 415, and/or VIM 420).

For example, the VNF controller operatively instantiates VNFs to support a network service, assigns priority values to each VNF, monitors the network resources allocated to each VNF. The VNF controller further determines one of the VNFs requires additional network resources (e.g., in response to a network condition such as a component failure, scaling operations, changes to network resource availability, etc.) and releases the network resources allocated to another, lower priority VNF. Further, the VNF controller instructs or otherwise allocates the released network resources to the VNF that requires additional network resources.

As one non-limiting example, and referring again to FIG. 4, VNF-1 requires additional network resources (e.g., a Virtual Machine (VM)) (e.g., due to a change in the data center network, a power failure, scaling operations, updated Service Level Agreement (SLA), etc.). In this example, VNF-O 410, VNFM 415, and VIM 420 cooperate to evaluate priority values assigned to multiple VNFs (i.e., VNF-1 and VNF-2), determine VNF-1 has a higher priority over VNF-2 (priority value 1 being more important than a priority value 2), release network resources from VNF-2 to VIM 420, and allocate the released resources to VNF-1.

Figure 5:
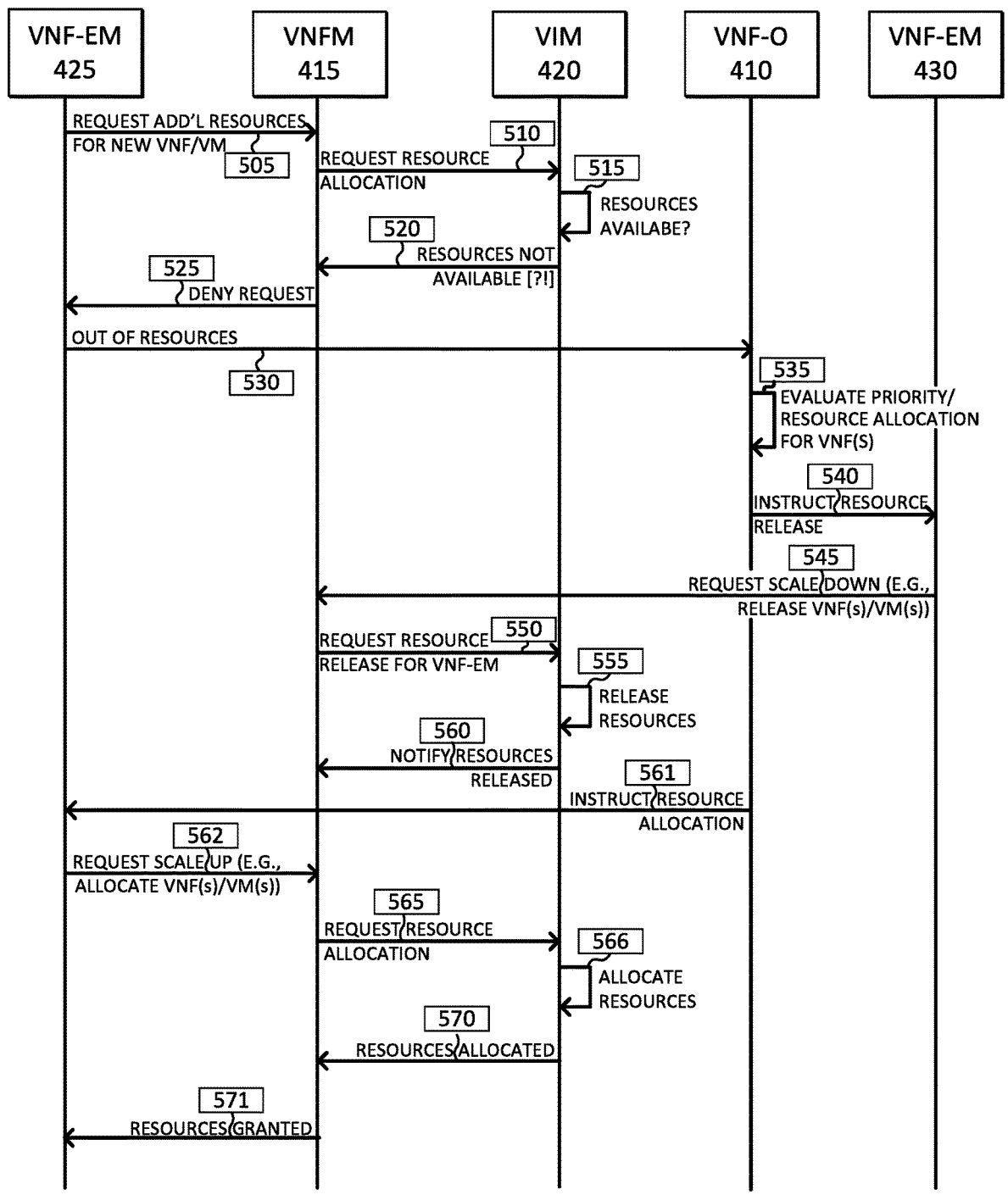
FIG. 5 illustrates a signaling diagram, showing communications between network components shown in FIG. 4.

Details regarding signal flows and component-specific communications for the foregoing VNF prioritization operations are illustrated in a signal flow diagram 500 illustrated by FIG. 5.

Signal flow diagram 500 begins with a signal 505 from VNF-EM 425 to VNFM 415. Signal 505 indicates a request for additional resources for a new VNF/VM. For example, VNF-EM 425 may require additional resources due to a network resource failure (e.g., power failure, component failure, etc.).

VNFM 415 receives the request and sends a request message 510 to VIM 420 for resource allocation. VIM 420 determines its resource availability at signal 515 and, at signal 520, indicates no resources are available. VNFM 415 indicates this lack of resources to VNF-EM 425 at signal 525, which causes VNF-EM 425 to send an "out-of-resources" signal 530 to VNF-O 410. VNF-O 410 evaluates, at signal 535, a priority amongst VNFs—here, amongst VNF-1 and VNF-2- and instructs, at signal 540, VNF-EM 430 (which is responsible for VNF-2) to release one of its VMs. As discussed above, VNF-2 is assigned a lower priority value (a priority value 2) than VNF-1 (a priority value 1). With respect to priority values, VNF-O 410, VNF-EM 425, and/or VNF-EM 430 can assign respective VNFs—here, VNF-1 and VNF-2—a priority value based on a customer impact (e.g., one VNF may serve a larger/smaller number of customers), a type of service (basic service, premium service, etc.), a load of the service, overall network impact, and/or a physical location for network resources allocated to each VNF.

After receiving the request to release resources, VNF-EM 430 sends a request, at signal 545, to scale down or release resources to VNFM 415, which further communicates with VIM 420 to facilitate the resource release. In particular, VNFM 415 requests the resource release at signal 550, VIM 420 releases the resources, shown by signal 555, and notifies VNFM 415 the resources are released at signal 560. In addition, VNF-O 410 instructs VNF-EM 425 to request an allocation of resources at signal 561. In response, VNF-EM 425 requests a scale up (e.g., resource allocation of the now-released resources) from VNFM 415 at signal 562. VNFM 415 sends a resource request at signal 565 to VIM 420 and VIM 420 allocates the resources at signal 566 and further indicates, to VNFM, the resources are allocated at signal 570. VNFM 415 further grants the resources to VNF-EM 430 at signal 571.

As discussed above, signaling diagram 500 illustrates operations performed by specific components to assign and evaluate priority(ies), release resources, and allocate released resources, however, it is appreciated such operations may also be performed by one or more components or modules. For example, it is specifically contemplated certain operations performed by VNFM 415, VNF-O 410, VNF-EM 425, and/or VNF-EM 430 may be combined into a single Virtual Network Functions (VNF) controller or module, as is appreciated by those skilled in the art.

In addition, while signaling diagram 500 illustrates VNF prioritization operations to manage resources based on a static priority value (e.g., VNF-1 (associated with VNF-EM 430) has a priority value of 1 while VNF-2 (associated with VNF-EM 425) has a priority value of 2), it is also appreciated this VNF prioritization scheme may be applied (or extended) in a more granular fashion. That is, it is appreciated in some embodiments that multiple VNFs may be assigned or associated with a same priority value. In such embodiments, the above-discussed VNF prioritization operations may include dynamic decision processes based on a policy at "run" time (e.g., decide to kill one VNF based on a current service impact. For example, a PGW service can manage 10M subs for each. In this example, one sub is failing, which can trigger a dynamic decision based on a dynamic runtime policy. Here, one VNF may have 8 M subs active while another VNF has 1 M subs. Accordingly, the VNF with 1 M subs may be killed to minimize the service impact on the VNF having 8 M subs.

Figure 6:
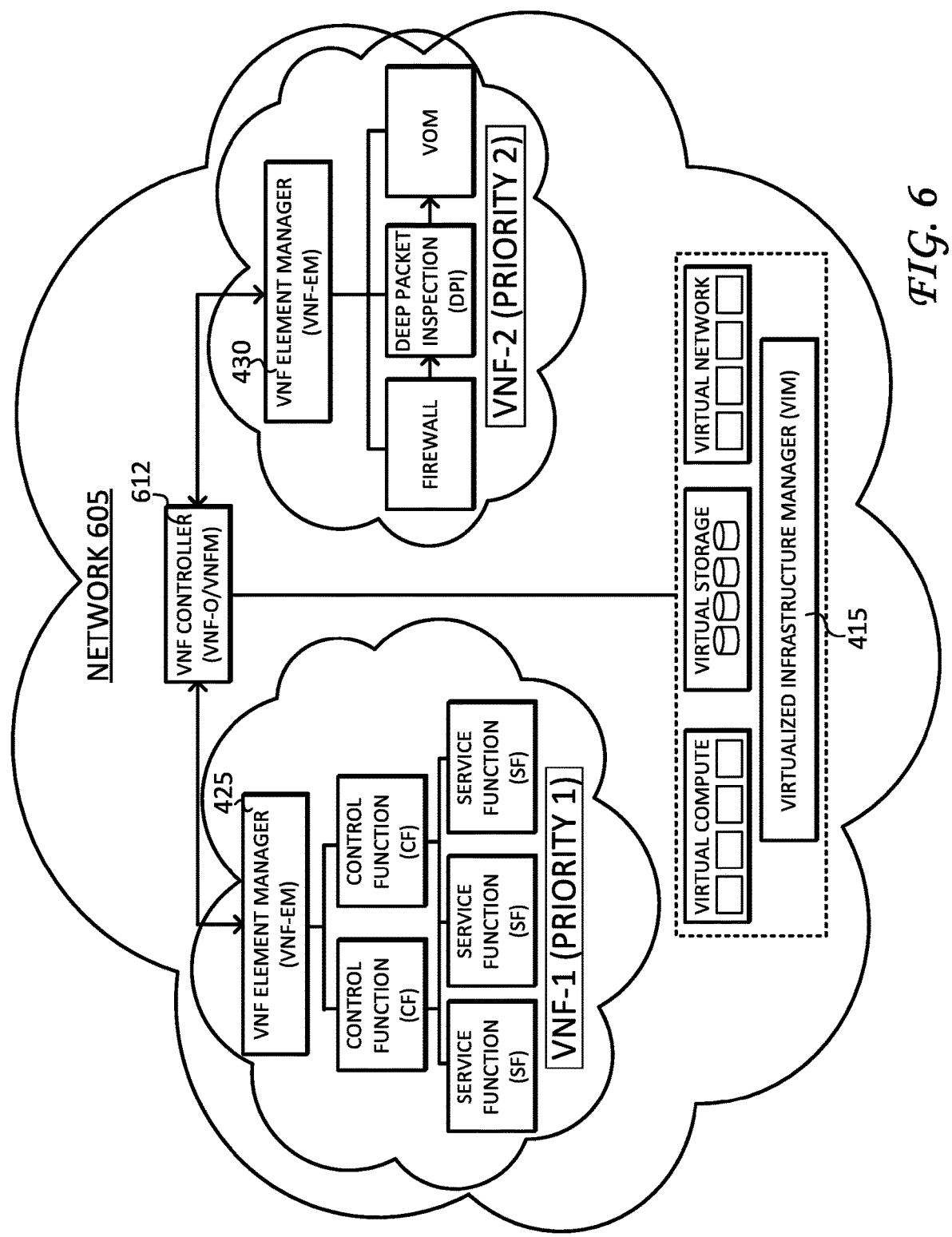
FIG. 6 illustrates another communication network, showing a VNF controller or module that performs Virtual Network Functions Orchestrator (VNF-O) and Virtual Network Functions Manage (VNFM) operations.

FIG. 6 illustrates another communication network 605, showing a VNF controller 612 (or module) that performs VNF-O and VNFM operations. In particular, VNF controller 612 is configured to perform the above-discussed operations of VNF-O 410 and VNFM 415. In addition, VNF-1 and VNF-2 are represented with different component resources or functional blocks, including a control function and a service function (VNF-1) as well as a firewall, deep packet inspection, and VOM (VNF-2). Notably, while the above-discussed operations generally include resource distribution amongst multiple VNFs, it should be noted VNF controller 612 can re-distribute network resources after a network condition is resolved (e.g., power is returned, a network resource is replaced after failure, and the like).

Figure 7:
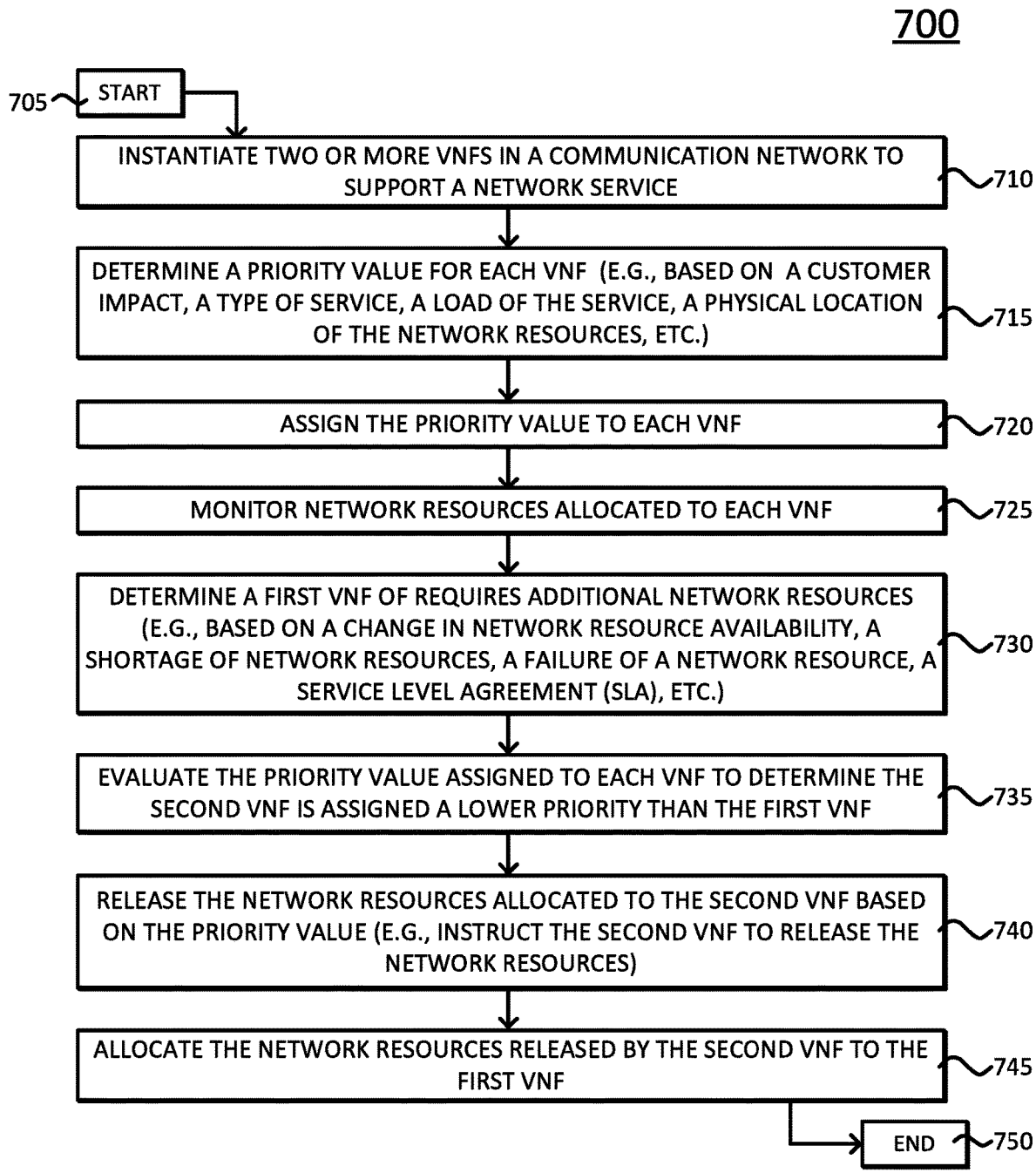
FIG. 7 is illustrates an exemplary simplified procedure for prioritizing resources amongst multiple VNFs in a communication network, particularly from the perspective of the VNF controller shown in FIG. 6.

FIG. 7 an example simplified procedure 700 for managing resources in a communication network based on a VNF priority, particularly from the perspective of a VNF controller (or module) (e.g., VNF controller 612).

Procedure 700 begins at step 705 and continues on to step 710 where, as discussed above, the VNF controller instantiates two or more VNFs in a communication network (e.g., a datacenter network) to support a network service.

The VNF controller further determines, in step 715, a priority value for each VNF based on, for example, a customer impact, a type of service (basic service, premium service, etc.), a load of the service, a physical location of the network resources, and the like. Alternatively, or in addition, the priority value may be established according to a Service Level Agreement (SLA) policy. The VNF controller assigns the priority value to each VNF in step 720 and monitors the network resources allocated to each VNF in step 725.

In step 730, the VNF controller determines one—e.g., a "first"—VNF requires additional network resources. For example, as discussed above, the first VNF may request additional network resources due to a shortage of network resources (e.g., power failure, scaling operations, healing operations, updated SLA(s), and the like). The VNF controller further evaluates, in step 735, the priority assigned to each VNF to determine the priority value assigned to the second VNF is lower than the priority value assigned to the first VNF.

The VNF controller also releases, in step 740, one or more network resources allocated to the second VNF based on its priority value. In operation, the VNF controller instructs the second VNF (e.g., an element manager for the second VNF) to release the one or more network resources. The VNF controller further allocates, in step 745, the one or more network resources released by the second VNF to the first VNF. For example, the VNF controller may coordinate with and/or instruct a Virtualized Infrastructure Manager (VIM) (e.g., VIM 420) to allocate the one or more network resources.

Procedure 700 subsequently ends in step 750, but may continue on to step 710 where, as discussed above, the VNF controller instantiates VNFs in a communication network to support a network service. It should be noted that certain steps within procedure 700 may be optional, and further, the steps shown in FIG. 7 are merely examples for illustration—certain other steps may be included or excluded as desired. Further, while a particular order of the steps is shown, this ordering is merely illustrative, and any suitable arrangement of the steps may be utilized without departing from the scope of the embodiments herein. In addition, although procedure 700 is described with respect to a VNF controller, certain operations may be executed in cooperation with other devices or modules, as discussed above.

The techniques herein provide a Virtual Network Functions priority techniques to distribute network resources amongst multiple VNFs in response to changes to network conditions (e.g., network resource failure, healing operations, scaling operations, and the like). These techniques allows a customer to define SLA policies and organize/prioritize VNFs and enforce such SLA policies in a given priority order at a VNF level. The techniques are flexible and can employ automatic mechanisms to quickly and efficiently redistribute network resources in order to maintain important services during adverse network conditions. For example, during any failure, resource crunch (threshold crossing) or scaling, a VNF controller (e.g., a service orchestrator) evaluates VNF priority while making healing/scaling decisions across VNFs. In this fashion, service providers can align the available resources to minimize overall impact.

While there have been shown and described illustrative embodiments and processes executed by a VNF controller/module, it is to be understood that various other adaptations and modifications may be made within the spirit and scope of the embodiments herein. For example, the embodiments have been shown and described herein with relation to one VNF controller; however, the embodiments in their broader sense are not as limited, and may, in fact, be used with any number of controllers organized in a distributed computing network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
   instantiating, by a Virtual Network Functions (VNF) controller, a plurality of VNFs in a communication network to support a network service, the plurality of VNFs comprising a first VNF and a second VNF;
   determining a respective priority value for a respective VNF of the plurality of VNFs including a respective priority value assigned to the first VNF and a respective priority value assigned to the second VNF, wherein the respective priority value for the respective VNF is determined based on an overall network impact, a physical location of at least one network resource allocated to the respective VNF, a type of service to be implemented by the respective VNF and a customer impact based on how many customers would be using the respective VNF;
   assigning, by the VNF controller to the respective VNF of the plurality of VNFs, the respective priority value determined for the respective VNF of the plurality of VNFs;
   monitoring, by the VNF controller, a respective set of network resources allocated to the respective VNF of the plurality of VNFs;
   determining that the first VNF requires additional network resources;
   releasing one or more network resources from the respective set of network resources that are allocated to the second VNF, the one or more network resources being released based on the respective priority value assigned to the first VNF and the respective priority value assigned to the second VNF; and
   allocating, by the VNF controller, the one or more network resources released by the second VNF to the first VNF.

2. The method of claim 1, further comprising:
   determining, based on a network resource allocation between two or more VNFs from the plurality of VNFs, a disproportionate service impact associated the two or more VNFs from the plurality of VNFs; and
   determining the respective priority value for each of the two or more VNFs based on the disproportionate service impact associated with the two or more VNFs.

3. The method of claim 1, further comprising:
   Determining that the respective priority value assigned to the second VNF is lower than the respective priority value assigned to the first VNF.

4. The method of claim 1, wherein releasing the one or more network resources further comprises:
   instructing, by the VNF controller, the second VNF to release the one or more network resources.

5. The method of claim 1, wherein allocating the one or more network resources further comprises:
   instructing, by the VNF controller, a Virtualized Infrastructure Manager (VIM) to allocate the one or more network resources released by the second VNF to the first VNF.

6. The method of claim 1, wherein determining that the first VNF requires the additional network resources is based on at least one of a change in network resource availability, a failure of a network resource, or a Service Level Agreement (SLA).

7. The method of claim 1, wherein the VNF controller includes at least one of a Virtual Network Functions Manager (VNFM), a Virtual Network Functions Orchestrator (VNF-O), or an Element Manager (EM).

8. The method of claim 1, wherein the respective set of network resources allocated to the respective VNF of the plurality of VNFs comprises at least one of a virtual server resource, a virtual compute resource, or a virtual storage resource.

9. A Virtual Network Functions (VNF) controller, comprising:
   one or more processors; and
   a memory having stored thereon instructions which, when executed by the one or more processors, cause the one or more processors to:
     instantiate a plurality of VNFs in a communication network to support a network service, the plurality of VNFs comprising a first VNF and a second VNF including a respective priority value assigned to the first VNF and a respective priority value assigned to the second VNF;
     determine a respective priority value for a respective VNF of the plurality of VNFs, wherein the respective priority value for the respective VNF is determined based on an overall network impact, a physical location of at least one network resource allocated to the respective VNF, a type of service to be implemented by the respective VNF and a customer impact based on how many customers would be using the respective VNF;
     assign, to the respective VNF of the plurality of VNFs, the respective priority value determined for the respective VNF of the plurality of VNFs;
     monitor a respective set of network resources allocated to the respective VNF of the plurality of VNFs;
     determine the first VNF requires additional network resources;
     release one or more network resources from the respective set of network resources that are allocated to the second VNF, the one or more network resources being released based on the respective priority value assigned to the first VNF and the respective priority value assigned to the second VNF; and
     allocate the one or more network resources released by the second VNF to the first VNF.

10. The VNF controller of claim 9, the memory having stored thereon instructions which, when executed by the one or more processors, cause the one or more processors to:
   determine, based on a network resource allocation between two or more VNFs from the plurality of VNFs, a disproportionate service impact associated the two or more VNFs from the plurality of VNFs; and
   determine the respective priority value for each of the two or more VNFs based on the disproportionate service impact associated with the two or more VNFs.

11. The VNF controller of claim 9, the memory having stored thereon instructions which, when executed by the one or more processors, cause the one or more processors to:
   determine that the respective priority value assigned to the second VNF is lower than the respective priority value assigned to the first VNF.

12. The VNF controller of claim 9, wherein the one or more network resources comprises:
   instructing the second VNF to release the at least one of the one or more network resources.

13. The VNF controller of claim 9, wherein allocating the one or more network resources comprises:
   instructing a Virtualized Infrastructure Manager (VIM) to allocate the one or more network resources released by the second VNF to the first VNF.

14. The VNF controller of claim 9, wherein determining the first VNF requires the additional network resources is based on at least one of a change in network resource availability, a failure of a network resource, or a Service Level Agreement (SLA).

15. The VNF controller of claim 9, wherein the VNF controller includes at least one of a Virtual Network Functions Manager (VNFM), a Virtual Network Functions Orchestrator (VNF-O), or an Element Manager (EM).

16. The VNF controller of claim 9, wherein the respective set of network resources allocated to the plurality of VNFs comprises at least one of a virtual server resource, a virtual compute resource, or a virtual storage resource.

17. A non-transitory computer-readable medium having instructions stored thereon, the instructions, when executed by one or more processors, are operable to:
   instantiate a plurality of VNFs in a communication network to support a network service, the plurality of VNFs comprising a first VNF and a second VNF including a respective priority value assigned to the first VNF and a respective priority value assigned to the second VNF;
   determine a respective priority value for a respective VNF of the plurality of VNFs, wherein the respective priority value for the respective VNF is determined based on an overall network impact, a physical location of at least one network resource allocated to the respective VNF, a type of service to be implemented by the respective VNF and a customer impact based on how many customers would be using the respective VNF;
   assign, to the respective VNF of the plurality of VNFs, the respective priority value determined for the respective VNF of the plurality of VNFs;
   monitor a respective set of network resources allocated to the respective VNF of the plurality of VNFs;
   determine the first VNF requires additional network resources;
   release one or more network resources from the respective set of network resources that are allocated to the second VNF, the one or more network resources being released based on the respective priority value assigned to the first VNF and the respective priority value assigned to the second VNF; and
   allocate the one or more network resources released by the second VNF to the first VNF.

18. The non-transitory computer-readable medium of claim 17, storing instructions that, when executed by the one or more processors, are further operable to:
   determine, based on a network resource allocation between two or more VNFs from the plurality of VNFs, a disproportionate service impact associated the two or more VNFs from the plurality of VNFs based on at least one of a customer impact, a type of service, a load of the service, or a physical location of the network resources allocated to the respective VNF; and
   determine the respective priority value for each of the two or more VNFs based on the disproportionate service impact associated with the two or more VNFs.

19. The non-transitory computer-readable medium of claim 17, wherein determining the first VNF requires the additional network resources is based on at least one of a change in network resource availability, a failure of a network resource, or a Service Level Agreement (SLA).

20. The non-transitory computer-readable medium of claim 17, wherein releasing the one or more network resources comprises:
   instructing the second VNF to release the one or more network resources.

* * * * *